(12) United States Patent
De'Longhi

(10) Patent No.: US 7,150,219 B2
(45) Date of Patent: Dec. 19, 2006

(54) FILTER CUP FOR COFFEE MACHINE AND COFFEE-MAKING PROCESS

(75) Inventor: Giuseppe De'Longhi, Treviso (IT)

(73) Assignee: De'Longhi S.p.A., Treviso (IT)

( * ) Notice: Subject to any disclaimer, the term of this patent is extended or adjusted under 35 U.S.C. 154(b) by 266 days.

(21) Appl. No.: 10/477,579

(22) PCT Filed: May 10, 2002

(86) PCT No.: PCT/EP02/05153

§ 371 (c)(1),
(2), (4) Date: Jan. 23, 2004

(87) PCT Pub. No.: WO02/091889

PCT Pub. Date: Nov. 21, 2002

(65) Prior Publication Data

US 2004/0112223 A1  Jun. 17, 2004

(30) Foreign Application Priority Data

May 11, 2001 (IT) ................... MI2001A0972

(51) Int. Cl.
*A47J 31/06* (2006.01)
(52) U.S. Cl. .................. 99/299; 99/302 R; 99/323

(58) Field of Classification Search ............... 99/323, 99/323.1, 299, 302 R
See application file for complete search history.

(56) References Cited

U.S. PATENT DOCUMENTS

| 4,644,856 A * | 2/1987 | Borgmann | 99/295 |
| 4,882,982 A * | 11/1989 | Muttoni | 99/295 |
| 5,590,581 A * | 1/1997 | Strub et al. | 99/302 R |
| 5,638,740 A * | 6/1997 | Cai | 99/295 |
| 6,412,394 B1 * | 7/2002 | Bonanno | 99/299 |

FOREIGN PATENT DOCUMENTS

EP  0727164  * 8/1996  ............... 99/302 R

* cited by examiner

*Primary Examiner*—Reginald L. Alexander
(74) *Attorney, Agent, or Firm*—Andrew Wilford

(57) ABSTRACT

A coffee machine has a filter holder receiving a filter cup adapted to hold a suspension of hot water and grounds. A generally horizontal filter forming a floor of the cup. The hot water infused by the grounds passes down through the filter as coffee. A side wall formed with a screwthread is provided on the cup underneath and generally perpendicular to the filter. A dispenser on the cup underneath the filter has an outlet directed generally perpendicularly at the side wall for spraying the coffee substantially perpendicularly against the screwthread and thereby generating froth.

23 Claims, 4 Drawing Sheets

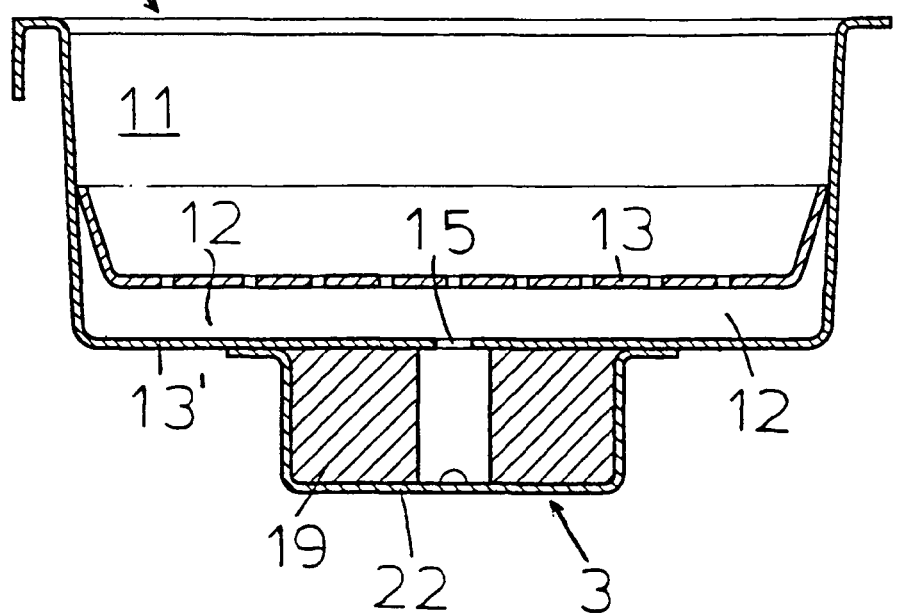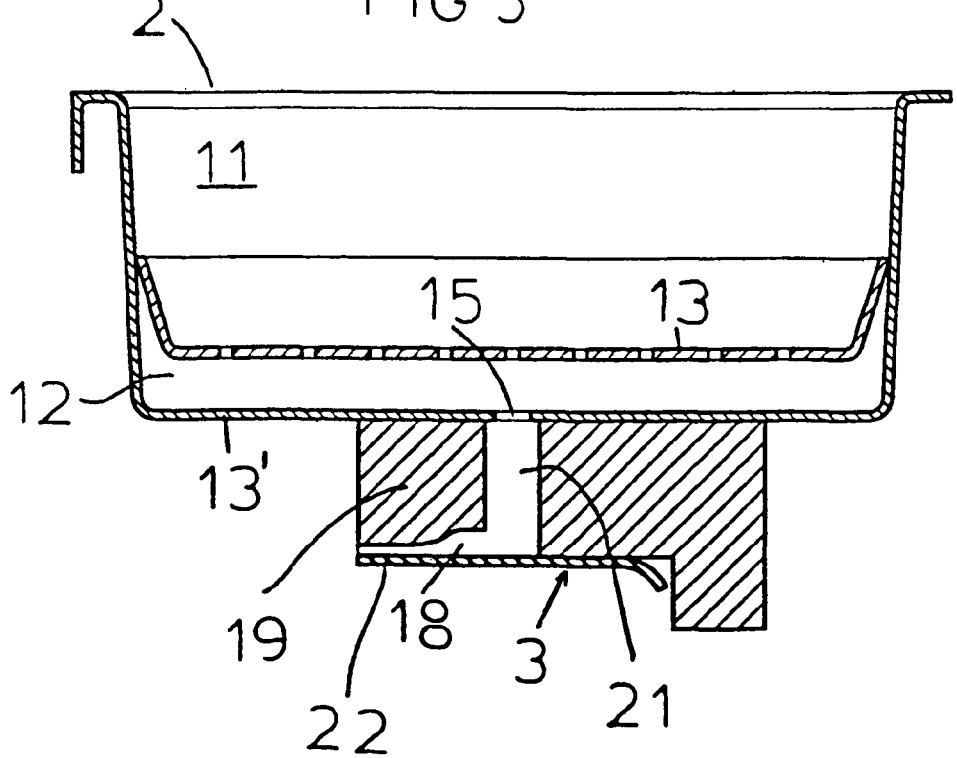

FILTER CUP FOR COFFEE MACHINE AND COFFEE-MAKING PROCESS

CROSS REFERENCE TO RELATED APPLICATIONS

This application is the US national phase of PCT application PCT/EP02/05153, filed 10 May 2002, published 21 Nov. 2002 as WO 02/091889, and claiming the priority of Italian patent application MI2001A000972 itself filed 11 May 2001.

FIELD OF THE INVENTION

The present invention refers to a filter-holding cup for a coffee machine and to a procedure for producing coffee.

BACKGROUND OF THE INVENTION

As is known, coffee machines have a filter-holding cup in which the filter is inserted. The filter cup usually has a flat structure and has a plurality of small pores that allow the liquid coffee to pass through but which hold back the coffee grounds.

Moreover, the filter cup in some cases carries a dispenser which sprays the coffee against the base of the cup, so as to produce a minimum amount of froth.

The coffee produced with traditional cups is finally released through two lower openings to fill two coffee cups.

Nevertheless in traditional cups the distribution of the coffee to the two openings (and therefore to the two coffee cups) is not uniform, i.e. the coffee usually tends to head toward one of the openings according to how the liquid jet is directed. This can be due both to the elastic characteristics of the dispenser itself and to possible impurities which could partially block its passage.

Moreover, cups of the traditional type allow cups of coffee to be produced which have a small amount of froth.

OBJECT OF THE INVENTION

The technical task proposed for the present invention is, therefore, that of eliminating the outlined technical drawbacks of the prior art, providing a filter-holding cup for a coffee machine which allows the coffee itself to be distributed uniformly between the discharge openings.

Another object of the invention is to provide a filter-holding cup for a coffee machine and a procedure for producing coffee which allow coffee with a lot of froth to be produced.

The last but not least object of the invention is that of providing a filter-holding cup for a coffee machine which allows access to all of its components and which, therefore, can be cleaned in a fast and simple manner.

SUMMARY OF THE INVENTION

These and other objects according to the present invention are achieved by providing a filter-holding cup for a coffee machine, characterized in that it comprises a dispenser, associated with the filter cup, suitable for spraying coffee against a side surface extending substantially perpendicular with respect to the surface of a filter holder of the filter cup.

The present invention also refers to a procedure for producing coffee, characterized in that the liquid coffee is sprayed through a dispenser capturing a first amount of air and forming froth, and is mixed with a flow of air capturing a second amount of air and forming further froth.

BRIEF DESCRIPTION OF THE DRAWING

Further characteristics and advantages of the invention shall become clearer from the description of a preferred but not exclusive embodiment of the filter-holding cup for a coffee machine and of the procedure for producing coffee according to the invention, where the cup is illustrated for indicating and not limiting purposes in the attached drawings, in which:

FIG. 4 is a cross section of a second embodiment of the filter cup according to the invention;

FIG. 5 is a 90° rotated section view of the filter cup of FIG. 4;

SPECIFIC DESCRIPTION

Figure 1:
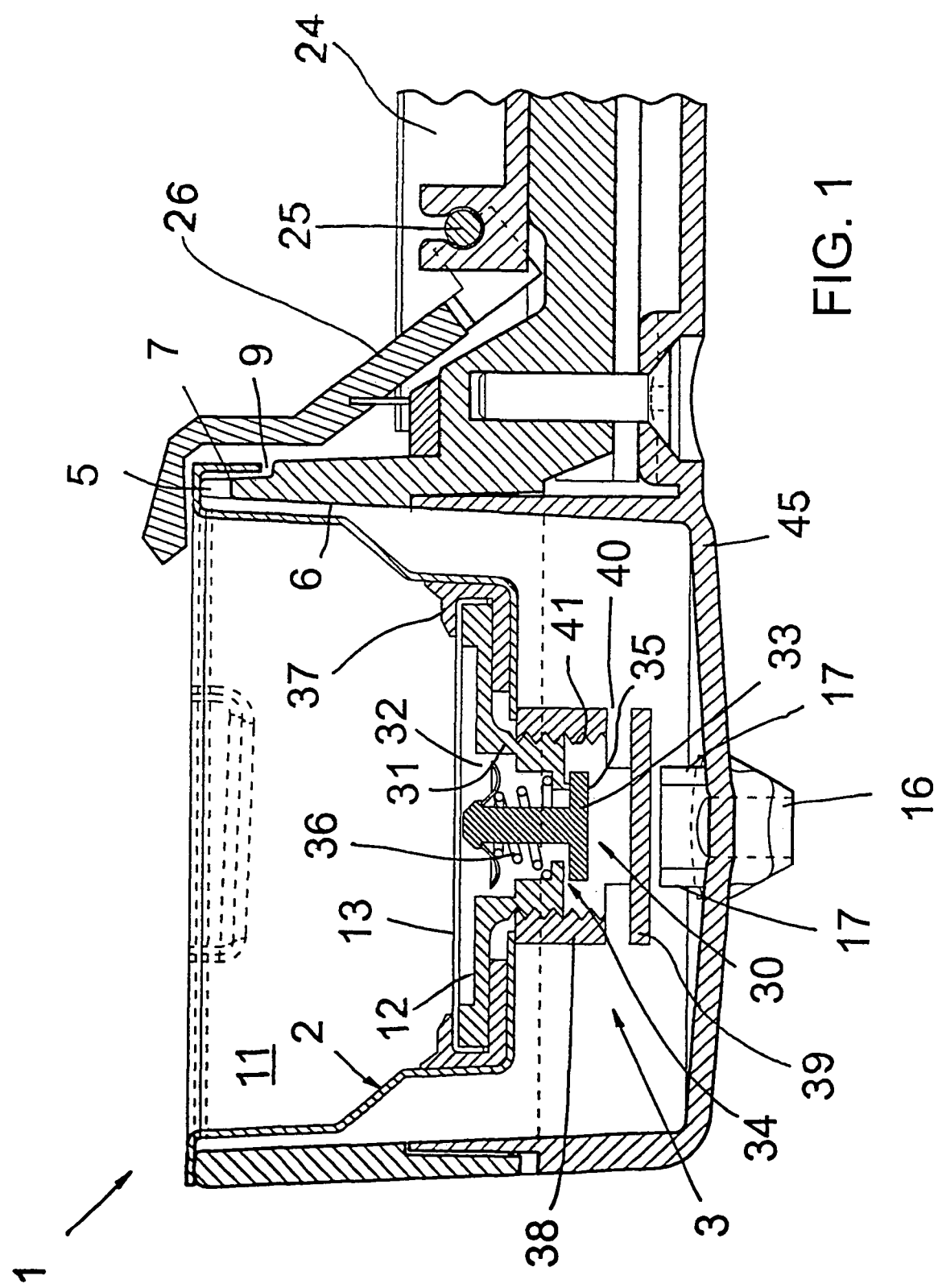
FIG. 1 is a schematic longitudinal section view of a portion of cup according to the invention.

A cup 1 comprises a dispenser 3 associated with a filter holder 2 suitable for spraying coffee against a side surface extending substantially perpendicular with respect to the surface of a filter 13 of the filter holder 2.

The dispenser 3 is connected to a base of the filter holder 2, preferably in a central position, and is housed in a chamber defined between the filter holder 2 itself and the cup 1.

Advantageously, a relatively broad air space is defined between the cup 1 and the filter holder 2. Such an enhanced space is formed by a groove 5 at the free edge of the cup 1, and a gap 6 defined between the cup 1 and the filter holder 2 itself.

Moreover, since the dispenser 3 must preferably spray the coffee near the passage 5, 6, the cup 1 and/or the filter holder 2 have interfitting positioning means which comprise a bent tab 7 that protrudes from the free edge 8 of the filter holder 2. The tab 7 is inserted into a grooved seat 9 of the cup 1.

The dispenser 3 also comprises a self-cleaning device 30 capable of allowing the automatic expulsion of possible residue or coffee particles which could hinder, as shall be specified more clearly, the formation of froth. The self-cleaning device 30 comprises a disk element 31 having at its center a passage 32 for the coffee coming through the filter 13.

Inside the passage 32 a valve 33 for closing the passage is housed. Between the valve and the disk element there is a hole 34 to let out the coffee.

The valve 33 has a disk 35 and is mobile in the housing by means of the action of elastic means and particular of a spring 36.

In the case of the hole 34 being blocked by residue or coffee particles the increase in pressure determines the displacement of the disk 35 equally allowing the dispensing of the coffee and, consequently, allowing the body blocking the hole 34 to be carried away.

The filter holder 2 has an annular gasket 37 to associate the disk element with the filter 13 and at the same time to seal on the sides and on the base of the filter holder 2. At the bottom of the disk element 31 there is a bushing 38 for attaching the disk element 31 and the filter 13 to the filter holder 2. The bushing 38 has a base 39 and at least two slits 40 through which the coffee can escape.

With this solution, advantageously, the coffee coming out of the hole 34 is directed against the surface of the bushing is 38 at the threads thereof which are arranged in front of the outlet hole 34.

In this way there is an air flow back through the slits 40 which mixes with the coffee sprayed against the thread 41. Such a solution allows a substantial formation of froth to be obtained which is then dispensed into the plastic floor 45 of the cup 1 and that then passes from here through the openings 16 into unillustrated coffee cups underneath the cup 1.

The cup 1, moreover, has a first chamber 11 inside the filter holder 2, and a second chamber 12 between the filter 13 of the filter holder 2 and the dispenser 3.

Figure 2:
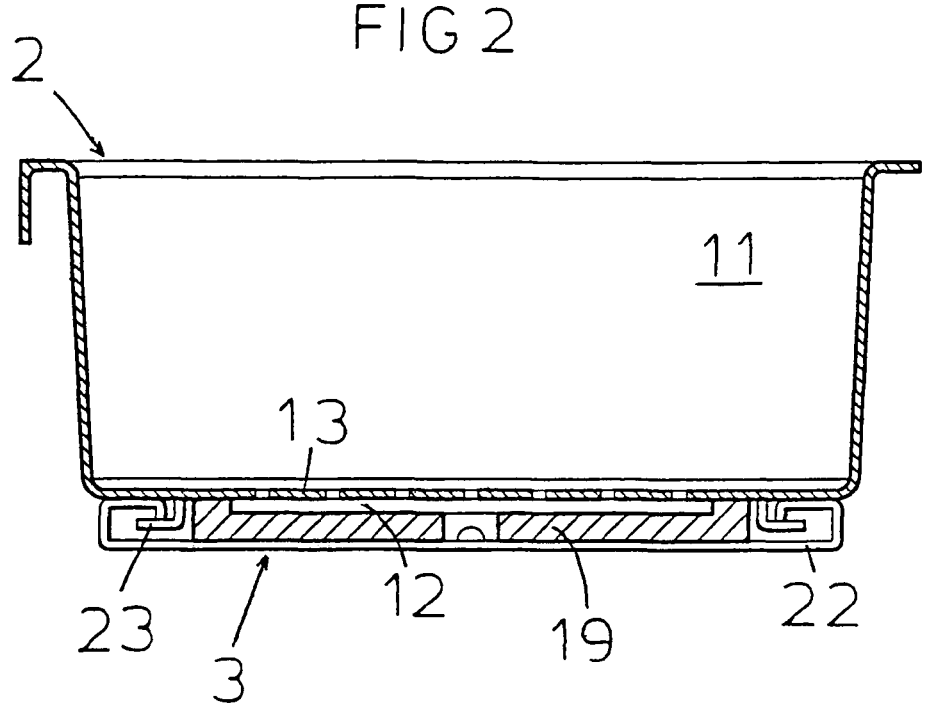
FIG. 2 is a cross section of a first embodiment of the filter cup according to the invention.
Figure 3:
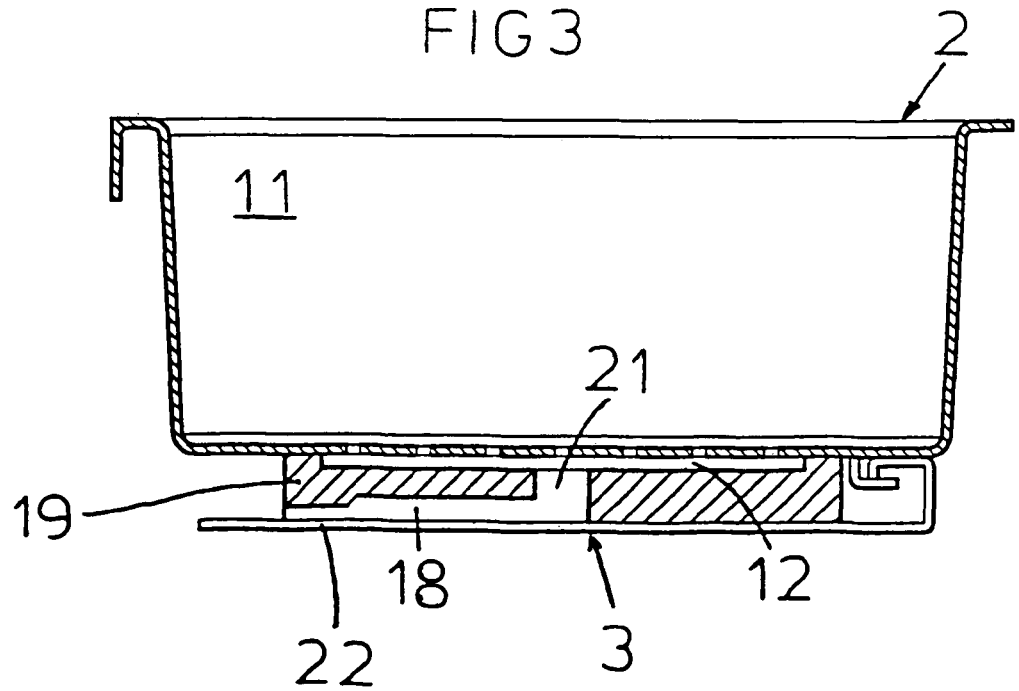
FIG. 3 is a 90° rotated section view of the filter cup of FIG. 2.
Figure 6:
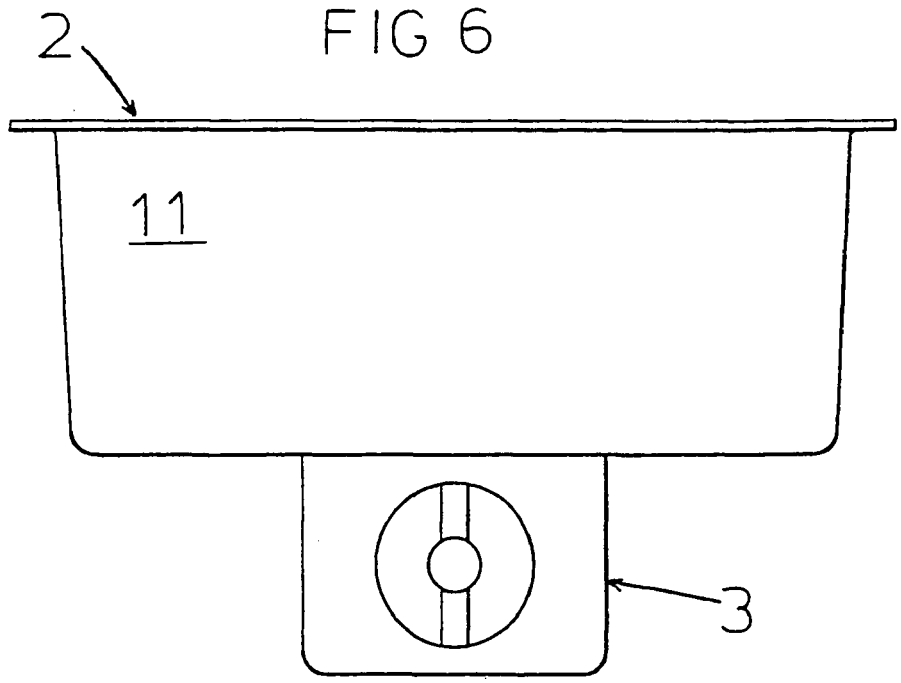
FIG. 6 is a cross section of a third embodiment of the filter cup according to the invention.
Figure 7:
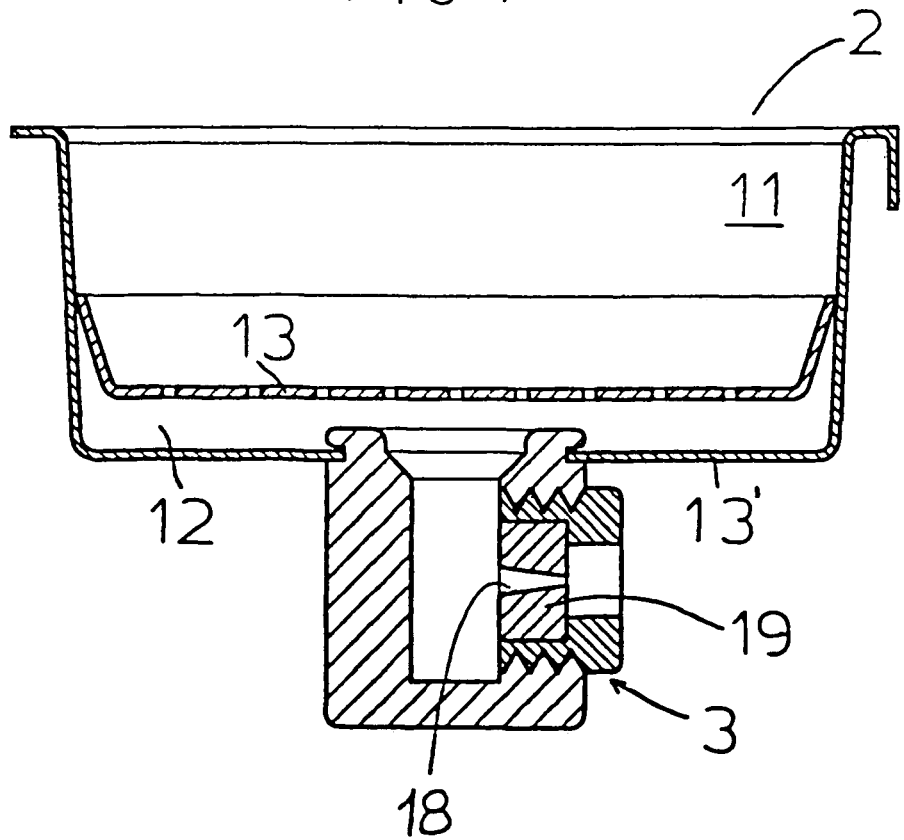
FIG. 7 is a 90° rotated section view of the filter cup of FIG. 6.

In a different embodiment of the cup 1 according to the invention (shown in FIGS. 2 and 3) such a filter 13 constitutes the base of the filter holder 2; however, in other embodiments (for example shown in. FIGS. 2 and 3) the filter 13 is connected inside the filter holder 2 in a removable or non-removable manner.

When the filter 13 is inside the filter holder 2 FIGS. 4 and 5, 6 and 7), a base 13' of the filter holder 2 has an opening 15 for the passage of the coffee to feed the dispenser 3.

The openings 16 the cup 1 open toward raised ribs 17 for guiding the coffee. Such ribs 17 are arranged perpendicular to the flow of the coffee so that the coffee, after having hit the threads 41 and having escaped through the slits 40, runs on the floor 45 to the opening 16. In this way one manages to guarantee a very uniform dispensing between the two openings 16.

In the examples shown in FIGS. 2–7, the dispenser 3 forms a passage which has at least one substantially converging first portion, preferably formed in an element made of elastically ductile material such as rubber or plastic. The passage also has a second portion 21 which is inclined with respect to the first portion 18 and which is arranged substantially vertically. Moreover, the dispenser 3 comprises a rigid element 22 connected to the filter holder 2 and suitable for at least partially containing the elastically ductile element 19.

Moreover, as shown in FIGS. 2, 3, 4 and 5, a portion of the passage 21 is bound by the rigid element 22 itself and the elastically ductile element 19 is removably connected between the base of the filter holder 2 and the rigid element 22.

Advantageously, the passage 18, 21 formed in this way tends not to become blocked or at least only becomes blocked to a very limited degree. Moreover, the passage 18, 21 can be cleaned and freed of possible elements which might block them in a very simple manner.

In the embodiment shown in FIGS. 2 and 3 the rigid element 22 is removably connected on guides 23 integral with the base of the filter holder 2. In this solution the rigid element 22 can be removed and, together with this, the element made of ductile material 19 can also be removed.

The cup 1 according to the invention also comprises a handle 24 that allows the cup 1 to be mounted onto and detached from the machine in a very simple and fast manner. The handle 24 has a pivot 25 to which a hooking element 26 is rotatably connected for locking a portion of the filter holder 2 against a corresponding portion of the cup 1 when the coffee grounds contained in the filter holder 2 are dumped out.

The operation of the filter-holding cup for a coffee machine according to the invention can be seen clearly from that which has been described and illustrated and, in particular, it is substantially the following.

Water crosses the chamber 11 of the filter holder 2 and forms the coffee and then through the filter 13 into the chamber 12.

In the embodiment of FIG. 1, from the chamber 12 the coffee enters into the passage 32 and comes out of the hole 34 in a direction which is substantially parallel to the filter 13. Then the coffee is sprayed against the surface and the threads 41 of the bush 38, capturing bubbles of air and forming a substantial froth. At the same time air flows in via the enhanced passage 5 and 6 and through the slits 40 with a further capturing of air in the coffee and formation of froth. The froth then comes out of the slits 40 and the two openings 16.

In the embodiments shown in FIGS. 2–7, from the chamber 12 the coffee enters into the portion 21 of the passage and then into the converging portion 18. The converging portion 18 is always directed toward the side wall of the floor 45 and, therefore, always sprays the coffee against such a wall forming froth.

Even when due to pressure the end of the passage deforms, the coffee is still sprayed against the side wall of the floor 45 and, swirling around the ribs 17, the coffee is dispensed by the two openings in practically equal amounts.

Moreover, the emission of the coffee from the cup 1 draws in air from the enhanced passage 5 and 6 and introduces it into the cup 1 and mixes it with the coffee with a further capturing of air in the coffee and the formation of froth.

Cleaning is extremely simple to carry out because the cup 1 according to the invention is capable of being completely disassembled, to allow access to all of its parts.

A procedure for producing coffee is also object of the present invention. According to such a procedure the coffee is sprayed through the dispenser 3, capturing a first amount of air and forming froth, and is subsequently mixed with a flow of air, capturing a second amount of air and forming further froth. In this way the coffee which is obtained is very rich in froth.

In a preferred embodiment of the procedure the coffee is formed inside the filter-holding cup 1 and, when it is released from the cup 1 through the openings 16, it draws in the current of air which mixes with the coffee subsequently sprayed by the dispenser 3.

In practice it has been noted how the filter-holding cup 1 for a coffee machine and a procedure for producing a coffee according to the invention are particularly advantageous because they allow coffee which is rich in froth to be formed and, at the same, they allow the coffee to be distributed in a uniform manner to two (or more) coffee cups.

The filter-holding cup for a coffee machine and the procedure for producing coffee thus conceived are susceptible to numerous modifications and variants, all covered by the inventive concept; moreover, all of the details can be replaced with technically equivalent elements.

In practice, the materials used, as well as the sizes, can be whatever according to the requirements and the state of the art.

The invention claimed is:

1. In combination with a coffee machine,
a filter holder;
a filter cup in the holder and adapted to hold a suspension of hot water and grounds;
a generally horizontal filter forming a floor of the cup, whereby the hot water infused by the grounds passes down through the filter as coffee;
a side wall formed with a screwthread on the cup underneath and generally perpendicular to the filter; and
dispenser means on the cup underneath the filter having an outlet directed generally perpendicularly at the side wall for spraying the coffee substantially perpendicularly against the screwthread and thereby generating froth.

2. The combination according to claim 1, characterized in that it comprises an enhanced air passage defined between said cup and said filter holder.

3. The combination according to claim 2, characterized in that said enhanced passage comprises at least one groove at a free edge of said cup and a space between said cup and said filter holder.

4. The combination according to claim 1, further comprising
a bent tab protruding from a portion of a free edge of said filter holder and inserted in a grooved seat of said cup.

5. The combination according to claim 1, characterized in that said dispenser means comprises a self-cleaning device.

6. The combination according to claim 5, characterized in that said self-cleaning device comprises a disk element having at its center a passage for housing a valve for closing said passage, the outlet being between said valve and said disk element.

7. The combination according to claim 6, characterized in that said valve has a disk which is mobile in said cup relative to and by means of the action of elastic means.

8. The combination according to claim 7, characterized in that it has an annular gasket between said disk element with said filtering wall.

9. The combination according to claim 8, characterized in that it comprises a bushing for attaching said disk element and said filter to said filter and forming the side wall.

10. The combination according to claim 9, characterized in that said bushing has a base and at least two outlet slits the coffee.

11. The combination according to claim 9, characterized in that the threads of said bushing are arranged in front of said outlet hole in a direction substantially perpendicular to said surface.

12. The combination according to claim 2, characterized in that it comprises at least one first chamber inside said filter holder, and a second chamber interposed between the filter of said filter holder and said dispenser means.

13. The combination according to claim 2, characterized in that said filter is connected to the inside of said filter holder, and a base of said filter holder has at least one opening for the passage of said coffee to said dispenser means.

14. The combination according to claim 2, characterized in that in correspondence with discharge openings of said coffee formed on a base of said cup, said cup has raised ribs for guiding said coffee.

15. The combination according to claim 14, characterized in that said ribs are arranged perpendicular to the flow of said coffee.

16. The combination according to claim 2, characterized in that said dispenser comprises at least one passage having at least one first substantially converging portion.

17. The combination according to claim 16, characterized in that at least said first portion of said passage is formed in an element made out of elastically ductile material.

18. The combination according to claim 16, characterized in that said passage has at least one second portion which is inclined with respect to said first portion.

19. The combination according to claim 2, characterized in that said dispenser means comprises a rigid element, connected to said filter holder, suitable for at least partially containing said elastically ductile element.

20. The combination according to claim 2, characterized in that at least one portion of said passage is bound by said rigid element.

21. The combination according to claim 2, characterized in that said elastically ductile element is removably connected between a base of said filter holder and said rigid element.

22. The combination according to claim 2, characterized in that said rigid element is removably connected on guides integral with said filter holder.

23. The combination according to claim 2, characterized in that it comprises a handle connected to said cup, said handle carrying a rotatable hook suitable for locking a portion of said filter holder against a corresponding portion of said cup when the grounds contained in said filter holder are discharged.

* * * * *